US006801906B1

(12) United States Patent
Bates et al.

(10) Patent No.: US 6,801,906 B1
(45) Date of Patent: Oct. 5, 2004

(54) METHOD AND APPARATUS FOR FINDING INFORMATION ON THE INTERNET

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,413

(22) Filed: Jan. 11, 2000

(51) Int. Cl.⁷ .............................................. G06F 17/30
(52) U.S. Cl. ..................... 707/3; 707/4; 707/2; 707/10; 707/5
(58) Field of Search ............................. 707/2, 3, 5, 10, 707/4

(56) References Cited

U.S. PATENT DOCUMENTS

| | | | | |
|---|---|---|---|---|
| 6,078,916 A | * | 6/2000 | Culliss ........................... | 707/5 |
| 6,112,240 A | * | 8/2000 | Pogue et al. ................. | 707/513 |
| 6,269,368 B1 | * | 7/2001 | Diamond ....................... | 707/6 |
| 6,314,420 B1 | * | 11/2001 | Lang et al. .................... | 707/3 |
| 6,327,590 B1 | * | 12/2001 | Chidlovskii et al. ........... | 707/5 |
| 6,401,118 B1 | * | 6/2002 | Thomas ....................... | 709/224 |
| 6,526,440 B1 | * | 2/2003 | Bharat ......................... | 709/219 |
| 6,571,234 B1 | * | 5/2003 | Knight et al. .................. | 707/3 |
| 6,725,259 B1 | * | 4/2004 | Bharat ......................... | 709/219 |

OTHER PUBLICATIONS

Pretschner et al. (Ontology based personalized search), Nov. 9–11, 1999, Tool with Artificial Intelligence, IEEE, p. 391–398.*

Lin et al. (Web Image retreival re–rank with relevance model), Oct. 13–19, 2003, p. 242–248.*

Mishra et al. (An intergrated MetaSearch engine with classification, clustering and ranking), Sep. 18–20, 2000, pp. 122–123.*

McKeown et al. (Levaraging a common representation for personalized search and Summarinzation in a Medical Digital Library), May 27–31, 2003, p. 159–170.*

Behnak et al. (Re–ranking search results using network analysis a case study with google: a case study with Google, 2002, p. 14.*

* cited by examiner

*Primary Examiner*—Jean M. Corrielus
*Assistant Examiner*—Baoquoc N To
(74) *Attorney, Agent, or Firm*—Roy W. Truelson

(57) ABSTRACT

When a search is made for information on the Internet, certain search parameters are saved in the user's system. If a subsequent related search is made, these search parameters are transferred to the internet search engine and used to reorder or otherwise modify the search results. Preferably, every time a search request is made, an entry is added to a cookie, containing the search terms and date of search. The search engine re-orders search results by dividing the results into multiple groups, including (in order of priority: (a) those URLs which are new since the last search; (b) those URLs which have been previously visited by have changed, the magnitude of change determining the ordering within this group; (c) those URLs which existed before the previous search, but have not been visited by the user; and (d) those URL's which the user has previously visited and have not changed. In the preferred embodiment, the user may optionally manually specify certain URLs to be included or excluded. The ordering of search results in accordance with the present invention provides the user with greater control and more meaningful information than current search technology.

14 Claims, 15 Drawing Sheets

| URL | TIMESTAMP CREATED | TIMESTAMP MODIFIED | PRIORITY | SECTION | % CHANGED | PAGE CNT | IMAGE CNT | PAGE SIZE |
|---|---|---|---|---|---|---|---|---|
| | | | | | | | | |
| | | | | | | | | |

FIG. 7

| Rank | URL | |
|------|-----|---|
| 1. | http://www.bostonredsox.com | 1101 |
| 2. | http://www.official.com | 1102 |
| 3. | http://www.bostonplayers.com | 1103 |
| 4. | http://www.fenwaypark.com | 1104 |
| 5. | http://www.bostonstars.com | 1105 |
| 6. | http://www.bostonpitchers.com | 1106 |
| 7. | http://www.majorleague.com | 1107 |
| 8. | http://www.tedwilliams.com | 1108 |
| 9. | http://www.carlyaz.com | 1109 |
| 10. | http://www.pedromartinez.com | 1110 |
| 11. | http://www.redsox.com | 1111 |

FIG. 11

| Rank | URL | |
|---|---|---|
| 1. | http://www.bostonredsox.com | 1201 |
| 2. | http://www.official.com | 1202 |
| 3. | http://www.bostonplayers.com | 1203 |
| 4. | http://www.redsox.com | 1204 |
| 5. | http://www.fenwaypark.com | 1205 |
| 6. | http://www.bostonstars.com | 1206 |
| 7. | http://www.bostonpitchers.com | 1207 |
| 8. | http://www.majorleague.com | 1208 |
| 9. | http://www.tedwilliams.com | 1209 |
| 10. | http://www.newballpark.com | 1210 |
| 11. | http://www.carlyaz.com | 1211 |
| 12. | http://www.pedromartinez.com | 1212 |
| 13. | http://www.redsox2old.com | 1213 |
| 14. | http://www.mlb.com | 1214 |

FIG. 12

| Adjusted Rank | Raw Rank | URL | |
|---|---|---|---|
| 1. | 9 | http://www.tedwilliams.com | 1301 |
| 2. | 11 | http://www.carlyaz.com | 1302 |
| 3. | 10 | http://www.newballpark.com | 1303 |
| 4. | 13 | http://www.redsox2old.com | 1304 |
| 5. | 14 | http://www.mlb.com | 1305 |
| 6. | 6 | http://www.bostonstars.com | 1306 |
| 7. | 1 | http://www.bostonredsox.com | 1307 |
| 8. | 3 | http://www.bostonplayers.com | 1308 |
| 9. | 4 | http://www.redsox.com | 1309 |
| 10. | 5 | http://www.fenwaypark.com | 1310 |
| 11. | 7 | http://www.bostonpitchers.com | 1311 |
| 12. | 12 | http://www.pedromartinez.com | 1312 |

FIG. 13

METHOD AND APPARATUS FOR FINDING INFORMATION ON THE INTERNET

FIELD OF THE INVENTION

The present invention relates to the use of the internet, and in particular, to computer hardware and/ore software which searches for information available on the Internet.

BACKGROUND OF THE INVENTION

One of the most remarkable applications of technology we have seen in recent years is the World Wide Web, often known simply as the "web". Nonexistent only a few short years ago, it has suddenly burst upon us. People from schoolchildren to the elderly are learning to use the web, and finding an almost endless variety of information from the convenience of their homes or places of work. Businesses, government, organizations, and even ordinary individuals are making information available on the web, to the degree that it is now the expectation that anything worth knowing about is available somewhere on the web.

Unfortunately, being available on the web, and being locatable on the web, are two very different things, as many a web user has discovered to his chagrin. The wealth of information that is the attraction of the web is also its major drawback. Unlike a library, where information is systematically classified and catalogued, there is no universal index for information available on the web.

To fill this void, numerous search engines are available to web users. A search engine is typically a web server which maintains a database of Uniform Resource Locators (URLs) and some content information about each URL. A user wishing to search the web for some information may submit a search request to a web search engine server, which will then search its database for URLs matching the search parameters.

Because there is no uniform, systematic classification of web information, the content information used by a search engine may be text from a web page, metatags, or other information. Typically, the search parameters are simply key words. I.e., if the key words submitted by the user (or even some of the key words) appear in the search engine's content information, the search engine will regard the URL as meeting the search criteria, and return the URL to the user. For many searches, this means that a very large number of URLs is returned.

Where many URLs are returned in response to a web search request, it is generally inconvenient for the user to browse each and every one of the URLs. The designers of web search engines have recognized this problem, and have attempted to address it by prioritizing the search results according to the number of keywords that appeared in the content information, the frequency of keywords used, or some similar criteria. By using such prioritization schemes, it is hoped that the URLs which most closely match the search criteria will be given the highest priority. These prioritization schemes provide some improvement over random listing of search results, but they are far from perfect in their ability to present the user with the most significant URLs first.

While not generally recognized, the shortcomings of current web search engine technology are particularly acute when applied to research-type searches. These are searches of a particular topic in-depth, in which it is usually necessary to repeat a prior search request in order to obtain the most current information, or to refine a prior search request after reviewing the results. A researcher who does this type of search in a traditional library can easily skip over material already viewed or eliminated from consideration, concentrating instead on material which is new. Current web search technology will simply do the search all over again from scratch, as if the prior search or searches were never performed. Therefore, the highest priority URLs returned by a web search engine are likely to be those already seen by the user, or eliminated from consideration.

There exists a need for improved web search capability, and in particular, an unrecognized need to perform research-type searches which take into consideration the results of previous searches.

SUMMARY OF THE INVENTION

In accordance with the present invention, when a search is made for information on the Internet, certain search parameters are saved in the user's system. If a subsequent related search is made, these search parameters are transferred to the internet search engine and used to reorder or otherwise modify the search results.

In the preferred embodiment, every time a search request is made, an entry is added to a cookie. The added entry contains the search terms and date of search. The search engine re-orders search results by dividing the results into groups, in the following order of priority: (a) those URLs which are new since the last search; (b) those URLs which have been previously visited and have changed, the magnitude of change determining the ordering within this group; (c) those URLs which existed before the previous search, but have not been visited by the user; and (d) those URL's which the user has previously visited and have not changed. In the preferred embodiment, the user may optionally manually specify certain URLs to be included or excluded.

In the preferred embodiment, information concerning prior searches is saved in a cookie on the client computer system, and passed to the search engine when making a subsequent search request. Additional information may be saved in a table of URLs visited by the client's browser.

The ordering of search results in accordance with the present invention provides the user with greater control and more meaningful information than current search technology.

The details of the present invention, both as to its structure and operation, can best be understood in reference to the accompanying drawings, in which like reference numerals refer to like parts, and in which:

BRIEF DESCRIPTION OF THE DRAWING

FIG. 7 shows the structure of the staging table in the server, according to the preferred embodiment.

FIGS. 11–13 illustrate a simple example of the application of the present invention according to the preferred embodiment, FIG. 11 showing ranked results of a first search, FIG. 12 showing raw results of a second search before re-ordering, and FIG. 13 showing adjusted results of the second search after re-ordering.

DETAILED DESCRIPTION OF THE PREFERRED EMBODIMENT

Overview

Figure 1:
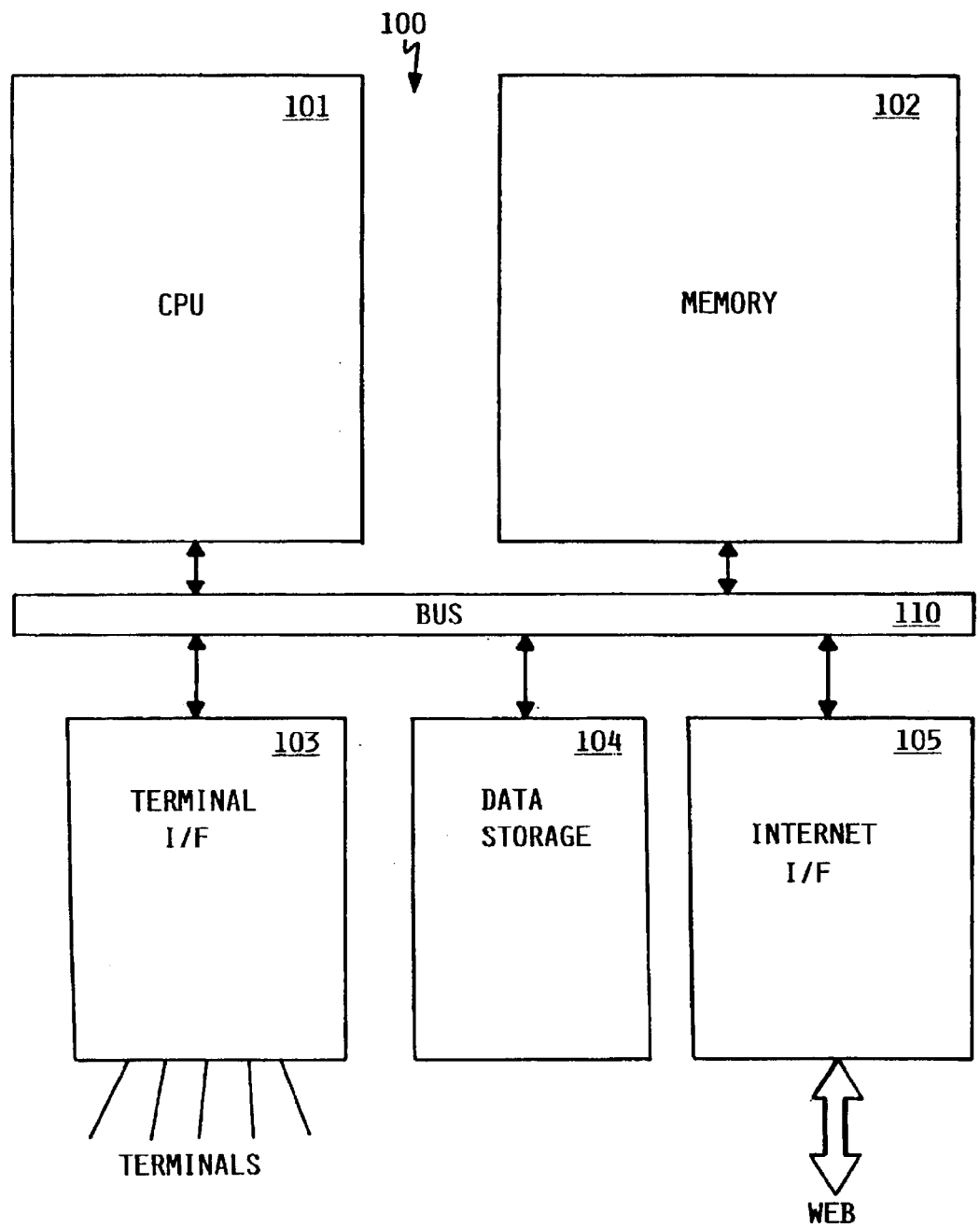
FIG. 1 is a high-level block diagram of a web server computer system, according to the preferred embodiment of the present invention.

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Networked systems typically follow a client server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the server itself. In networked systems, a client is usually c computer that accesses shared network resources provided by another computer (i.e., a server).

A server is typically a remote computer system accessible over a communications medium such as the Internet. The server scans and searches for information sources. Based upon such requests by the user, the server presents filtered, electronic information to the user as server response to the client process. The client process may be active in a first computer system, and the server process may be active in a second computer system; the processes communicate with one another over a communications medium that allows multiple clients to take advantage of the information gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW), or simply, the "web", includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office. The URL specifies a hypertext transfer protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server.

Active within the client is a first process, known as a "browser, that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, chat-rooms, and video objects. A web page can be constructed by loading one or more separate files into an active directory or file structure that is then displayed as a viewable object within a graphical user interface.

A search engine is a special type of web server, whose purpose is to provide information about other web sites. The search engine may be viewed as the web's analog to a card catalog or other indexing system used in a library, although it does not necessarily operate in the same manner. A search engine will typically maintain a database of web URLs, along with content information for each URL. In many cases, the content of URLs is classified by the search engine's database according to any of various categories arranged in a tree structure from general to more specific. One method of finding URLs using a search engine is to use the search engine's classification tree to specify a category of interest. This is often sufficient for very general inquiries, particularly those which are likely to be requested by a lot of people. But as the nature of the inquiry becomes more specific, this method is unlikely to produce good results. Therefore search engines typically provide a keyword search capability, for responding to an inquiry for which no specific class has been provided by the designers of the search engine's database. Keyword searching involves looking in the search engine's database for occurrences of the keyword (s) in the content information. When a match is found, the corresponding URL is regarded as "hit". A search engine may return many hits in response to a single keyword search. Typically, the search engine prioritizes multiple hits using an internal prioritization algorithm.

Detailed Description

Referring to the Drawing, wherein like numbers denote like parts throughout the several views, FIG. 1 shows a high-level block diagram of a server computer system 100 acting as a web search engine, consistent with the preferred embodiment. Computer system 100 comprises central processing unit (CPU) 101, main memory 102, terminal interface 103, data storage 104, and internet interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Terminal interface 103 may support the attachment of a single or multiple terminals, and may be implemented as one or multiple electronic circuit cards or other units. Data storage 104 preferably comprises one or more rotating magnetic hard disk drive units, although other types of data storage could be used. Internet interface 105 provides a physical connection for transmission of data to and from the Internet, and could use any of various available technologies. Communications bus 110 supports transfer of data, commands and other information between different devices; while shown in simplified form as a single bus, it is typically structured as multiple buses, and may be arranged in a hierarchical form The computer system shown in FIG. 1 is intended to be a simplified representation, it being understood that many variations in system configuration are possible in addition to those specifically mentioned here. While system 100 could conceivably be a personal computer system an internet search engine is more typically supported on a larger computer system-such as an IBM Enterprise System or an IBM AS/400 system.

Figure 2:
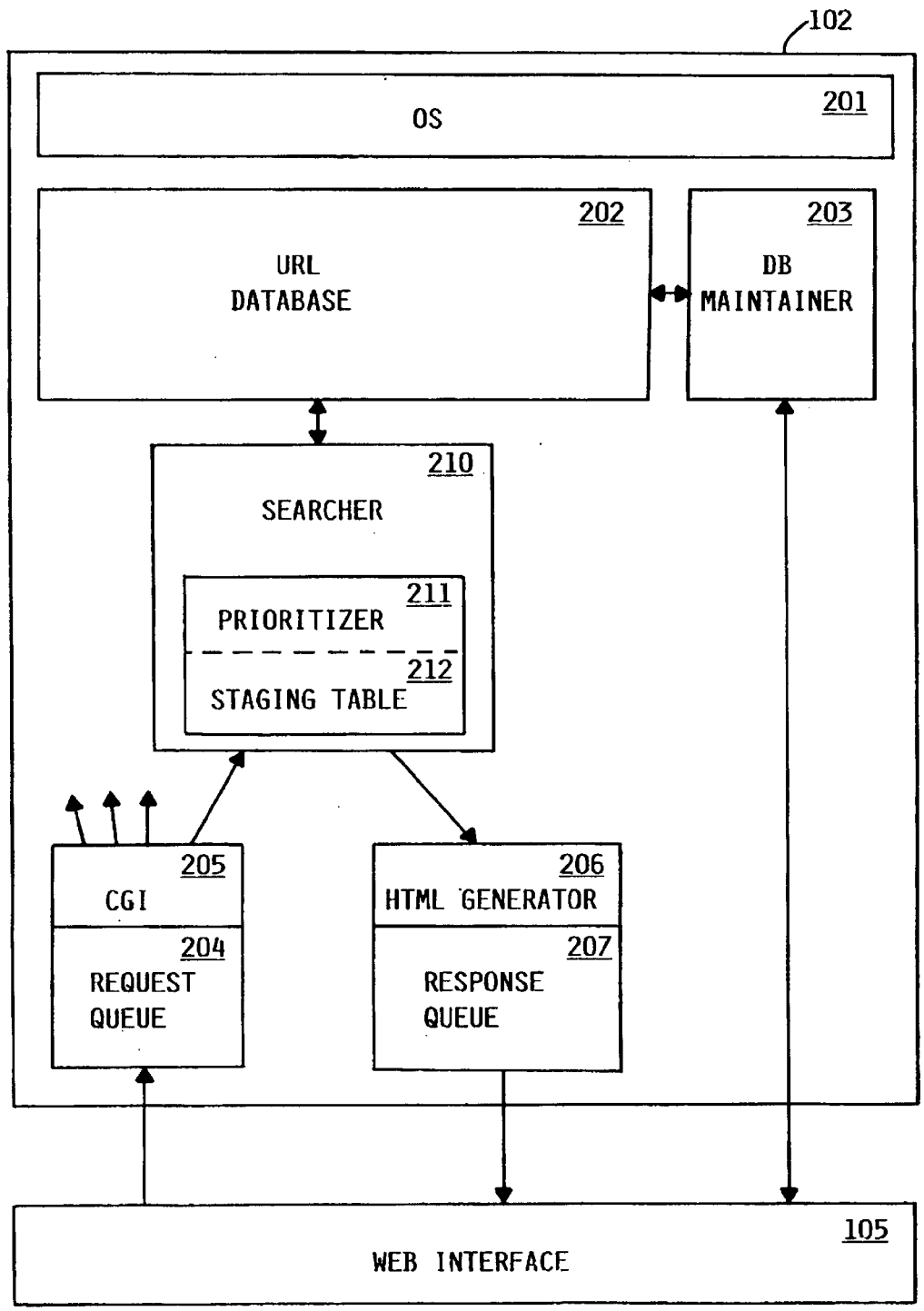
FIG. 2 is a conceptual illustration of the major software components of a server computer system for servicing search requests on the web, in accordance with the preferred embodiment.

FIG. 2 is a conceptual illustration of the major software components of server system 100 in memory 102. Operating system 201 provides various low-level software functions, such as device interfaces, management of memory pages, management of multiple tasks, etc. as is well-known in the art. A URL content database 202 contains content information with respect to a large number of URLs. Database 202 is updated on an ongoing basis by database maintainer 203, which gets information from the web.

Request queue 204 temporarily stores requests received over the internet from various clients. Common Gateway Interface (CGI) 205 acts as a request dispatcher, removing requests from the queue and initiates processes in response to the requests. Depending on the server configuration, it is possible that many different types of requests are received and serviced, not all of which are search requests. Therefore CGI 205 is shown as having multiple output paths, it being understood that computer system 100 may instead be a dedicated search engine which does nothing but perform searches. Searcher 210 receives search requests, and accesses URL database 202 to generate responses to the search requests. The responses are passed to HTML generator 206, which formats the search response as a web page in HTML format, and places the formatted web page response on response queue 207, from which it is transmitted by web interface 105 over the Internet to the requesting client.

While the software components of FIG. 2 are shown conceptually as residing in memory, it will be understood that in general the memory of a computer system will be too small to hold all programs and data simultaneously, and that information is typically stored in data storage 104, comprising one or more mass storage devices such as rotating magnetic disk drives, and that the information is paged into memory by the operating system as required.

Server computer 100 and its components are shown and described in FIGS. 1 and 2 as a more or less single, self-contained computer system. It is possible to implement a web server in such a manner. It is alternatively possible to use multiple computer systems, particularly multiple systems which share a single large database, each having a specialized task. For example, one or more computer systems could be dedicated to database maintenance, while one or more other computer systems are dedicated to servicing requests received from clients. References herein to a "server" or "search engine" should be understood to include either a single computer or a collection of computer systems which respond to search requests.

Figure 3:
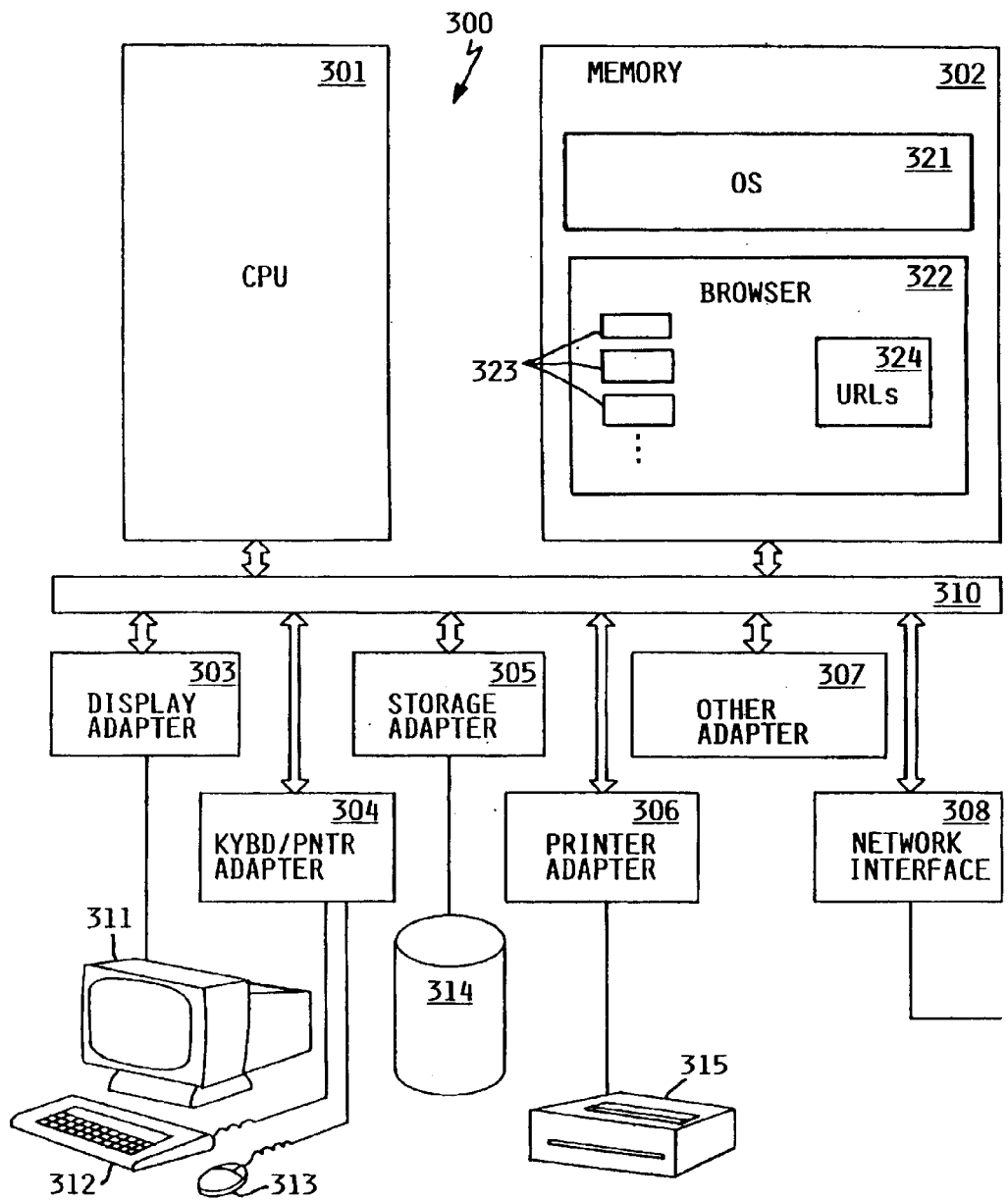
FIG. 3 is a high-level block diagram of a typical client computer system from which web search requests are submitted, according to the preferred embodiment.

FIG. 3 illustrates a typical client computer system 300 from which web search requests are submitted, according to the preferred embodiment. Client computer system 300 includes CPU 301, main memory 302, various device adapters and interfaces 303–308, and communications bus 310. CPU 301 is a general-purpose programmable processor, executing instructions stored in memory 302; while a single CPU is shown in FIG. 3, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 310 supports transfer of data, commands and other information between different devices; while shown in simplified form as a single bus, it may be structured as multiple buses, and may be arranged in a hierarchical form. Display adapter supports video display 311, which is typically a cathode-ray tube display, although other display technologies may be used. Keyboard/pointer adapter 304 supports keyboard 312 and pointing device 313, depicted as a mouse, it being understood that other forms of input devices could be used. Storage adapter 305 supports one or more data storage devices 314, which are typically rotating magnetic hard disk drives, although other data storage devices could be used. Printer adapter 306 supports printer 315. Adapter 307 may support any of a variety of additional devices, such as CD-ROM drives, audio devices, etc. Network interface 308 provides a physical interface to the Internet. In a typical personal computer system, this interface often comprises a modem connected to a telephone line, through which an Internet access provider or on-line service provider is reached. However, many other types of interface are possible. For example, computer system 300 may be connected to a local mainframe computer system via a local area network using an Ethernet, Token Ring, or other protocol, the mainframe in turn being connected to the Internet. Alternatively, Internet access may be provided through cable TV, wireless, or other types of connection. Computer system 300 will typically be any of various models of single-user computer systems known as "personal computers". The representation of FIG. 3 is intended as an exemplary simplified representation, it being understood that many variations in system configuration are possible in addition to those mentioned here. Furthermore, a client requesting a web search in accordance with the present invention need not be a personal computer system, and may be a larger computer system, a notebook or laptop computer. Finally, such a client need not be a general-purpose computer system at all, but may be a special-purpose device for accessing the web, such as an Internet access box for a television set, or a portable wireless web accessing device.

As shown in FIG. 3, operating system 321 and browser 322 reside in memory 302. Operating system 321 provides various low-level software functions, such as device interfaces, management of memory pages, management of multiple tasks, etc. as is well-known in the art. Browser 322 provides a user interface to the web. Browser 322 may be integrated into operating system 321, or may be a separate application program. Browser 322 has the capability to store multiple "cookies" 323. When the client again accesses the same server web site, browser 322 sends a copy of the corresponding cookie to the server. A cookie may be used, e.g., to identify a client, to store and submit account information, to store profiling information, etc. Cookies are well-known in the art of web interfaces. Browser 322 also maintains a table of URLs 324 that the client has visited., as explained more fully herein.

Figure 4:
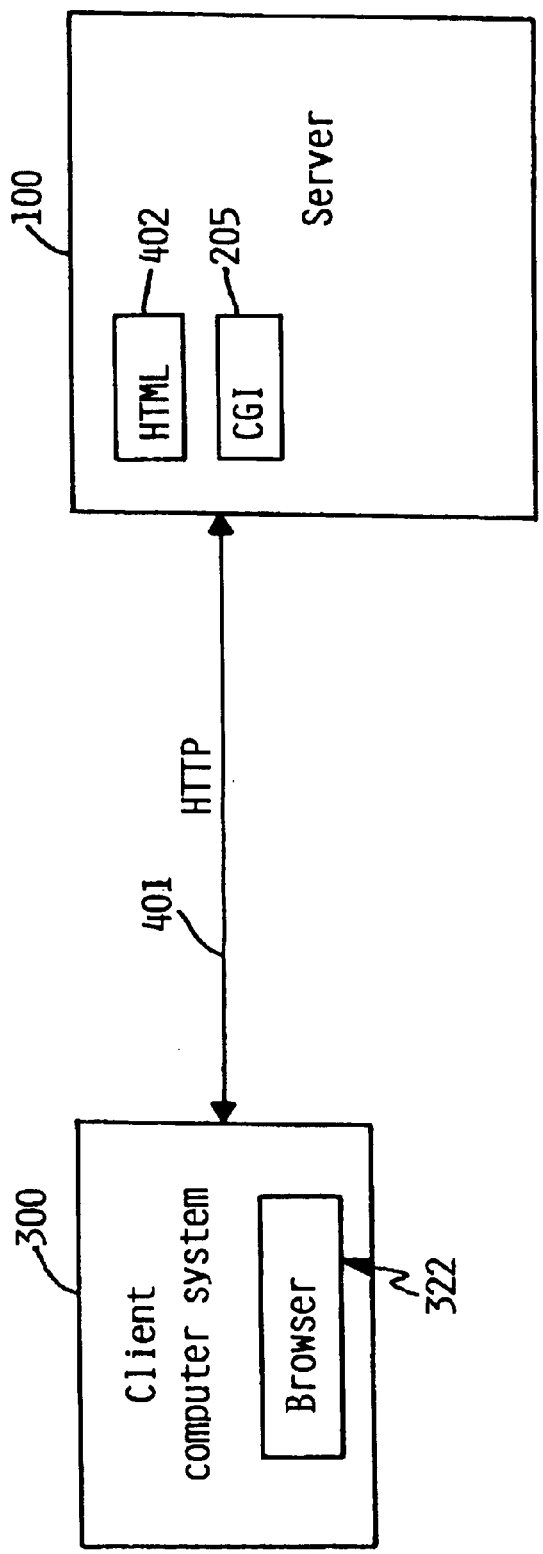
FIG. 4 is a block diagram illustrative of a client/server architecture, according to the preferred embodiment.

FIG. 4 is a block diagram illustrative of a client/server architecture. Client system 300 and server system 100 communicate by utilizing the functionality provided by HTTP. Active within client system 300 is browser 322, which established connections with server 100 and presents information to the user. Server 100 executes the corresponding server software, which presents information to the client in the form of HTTP responses 401. The HTTP responses correspond to the web pages represented using HTML or other data generated by server 100. Server 100 generates HTML document 402, which is a file of control codes that server 100 sends to client 300 and which browser 322 then interprets to present information to the user. Server 100 also provides Common Gateway Interface (CGI) program 205, which allows client 300 to direct server 100 to commence execution of the sepcified program contained within server 100. In the preferred embodiment, an example of one such specified program is search program 210, as described more fully herein. CGI program 205 executes on CPU 101. Referring again to FIG. 4, using the CGI program and HTTP responses 401, server 100 may notify client 300 of the results of that execution upon completion. Although the protocols of HTML, CGI and HTTP are shown, any suitable protocols could be used.

Figure 5:
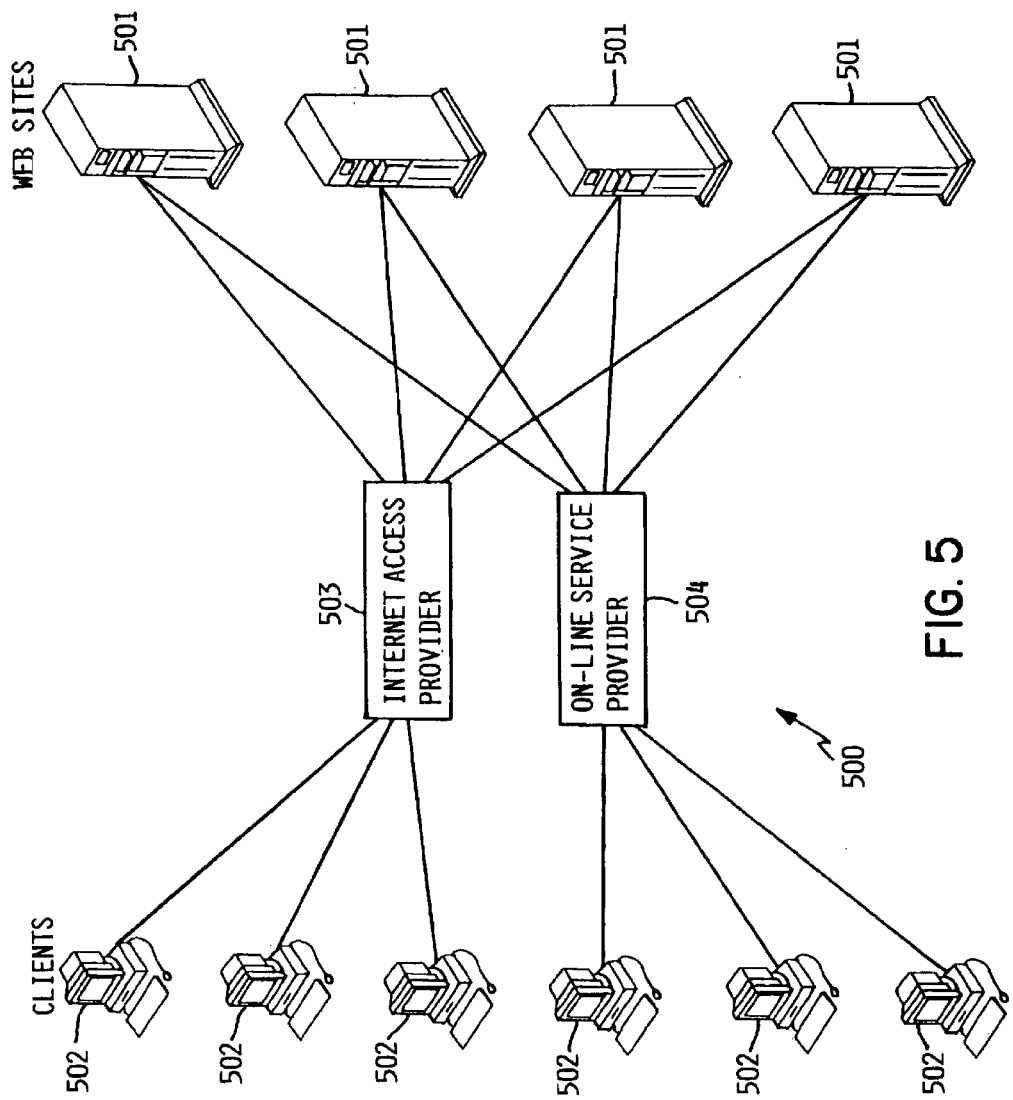
FIG. 5 is a simplified representation of a computer network such as the Internet, according to the preferred embodiment.

FIG. 5 is a simplified representation of a computer network 500. Computer network 500 is representative of the Internet, which can be described as a known computer network based on the client-server model discussed herein. Conceptually, the Internet includes a large network of servers 501 (such as server 100) that are accessible by clients 502, typically computers such as computer system 300, through some private Internet access provider 503 or an on-line service provider 504. Each of the clients 502 may run a respective browser to access servers 501 via the access providers. Each server 501 operates a so-called "web site" that supports files in the form of documents or pages. A network path to servers 501 is identified by a Universal Resource Locator (URL) having a known syntax for defining a network connection. While various relatively direct paths are shown, it will be understood that FIG. 5 is a conceptual representation only, and that a computer network such as the Internet may in fact have a far more complex structure.

Figure 6A:
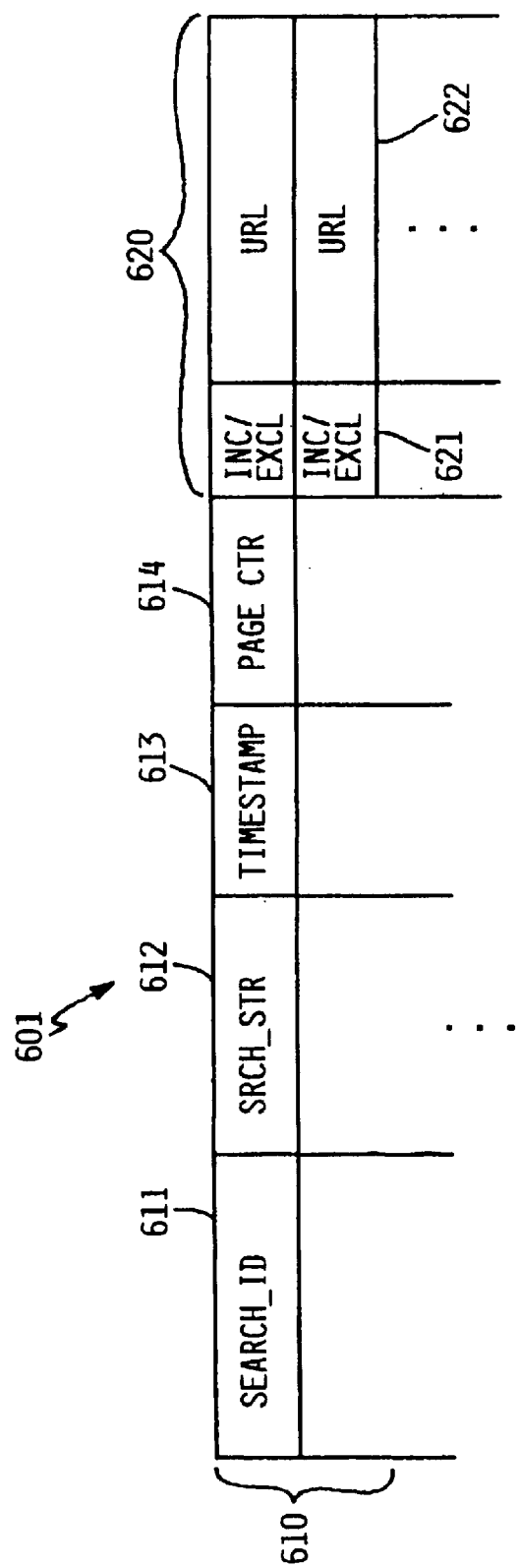
FIGS. 6A and 6B represent the structure of the cookie and URL table, respectively, stored in a client for supporting enhanced search capability, according to the preferred embodiment.
Figure 6B:
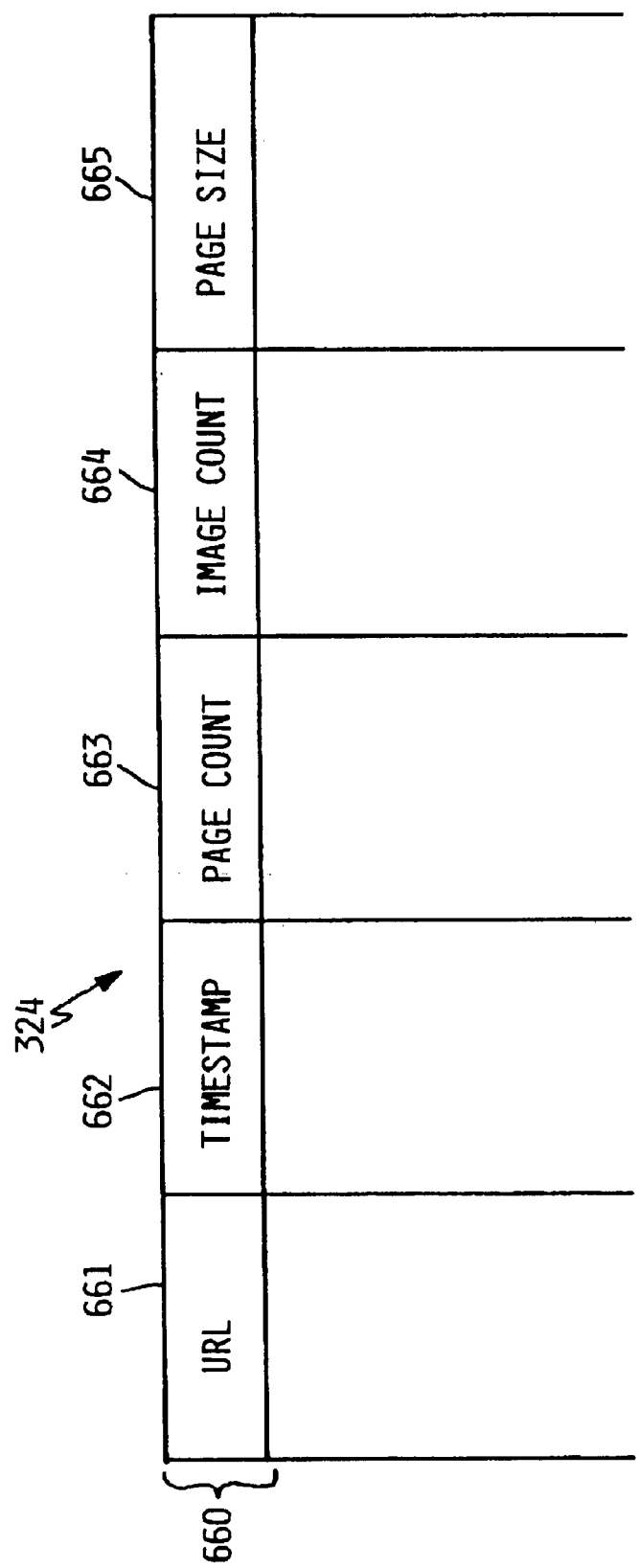

In accordance with the preferred embodiment of the present invention, a web search requested by client 300 is modified by search engine server 100 using the results of one or more previous web searches performed by the same client. In order to support this enhanced search capability, server 100 generates a cookie containing key information about one or more prior searches, for storage in the browser 322 of client system 300. Additionally, browser 322 maintains information concerning URLs visited by the client. FIGS. 6A and 6B represent the structure of the cookie and URL table, respectively.

As shown in FIG. 6A, cookie 601 for storing information about prior searches comprises a table having one or more entries. Each entry 610 corresponds to a search that was previously performed by server 100 on behalf of client 300. Each entry 610 includes a search identifier field 611, a search string field 612, a timestamp field 613, a page counter field 614, and optionally one or more include/exclude records 620. Each include/exclude record 620 specifies a web site URL that was returned by the search engine in response to the previous search, which the user has determined to either exclude from or include in any subsequent searches. Each web site record contains an inclusion/exclusion bit 621 and a URL 622 of the web site. Cookie 601 is just one of the cookies 323 stored in client 300, it being understood that client 300 may store many other unrelated cookies for other applications.

Search identifier is an optional arbitrary identifier, such as a descriptive name, which is assigned by the user to identify a search. Search string 612 contains the search parameters (e.g., string of keywords and logical operators) from the previous search. Timestamp 613 contains the date and time of the previous search. Page counter 614 contains the highest page number of search results actually retrieved by the user, and is used for estimating whether the user has actually seen the same URL when doing a subsequent search.

As shown in FIG. 6B, URL table 324 comprises a plurality of entries 660, each entry having a URL field 661, a timestamp 662, a page count 663, an image count 664, and a page size 665. URL field 661 contains the URL of a visited web site. Timestamp field 662 contains the date and time when it was last visited. Page count 663, image count 664 and page size 665 contain the number of pages, number of images, and size of pages, respectively, of the web site when last visited, and are used for estimating the degree to which a web site has changed.

FIG. 7 shows the structure of staging table 212. Staging table is used by searcher 210 as a temporary scratch pad area of memory for saving and prioritizing search results. Staging table 212 comprises a plurality of entries 700, each entry corresponding to one web site (URL) matching the parameters of the requested search. Each entry 700 contains URL field 701, timestamp created field 702, timestamp modified field 703, priority field 704, section field 705, percentage change field 706, page count field 707, image count field 708, and page size filed 709. Staging table may contain additional fields (not shown). URL field 701 contains the URL to the web site matching the search parameters. Created field 702 contains the date and time the URL was added to database 202. Modified field 703 contains the date and time the web site addressed by the URL was last modified. Priority field 704 contains a calculated priority of the web site, i.e., a measure of how close it matches the search parameters. Section field 705 contains a section number assigned by the prioritizer, as explained more fully herein. Percentage change field 706 contains an estimate of the amount of change to a web site since last visited by the client. Page count 707, image count 708 and page size 709 are analogous to field 663–665, but contain information concerning the most recently updated data from database 202.

Figure 8:
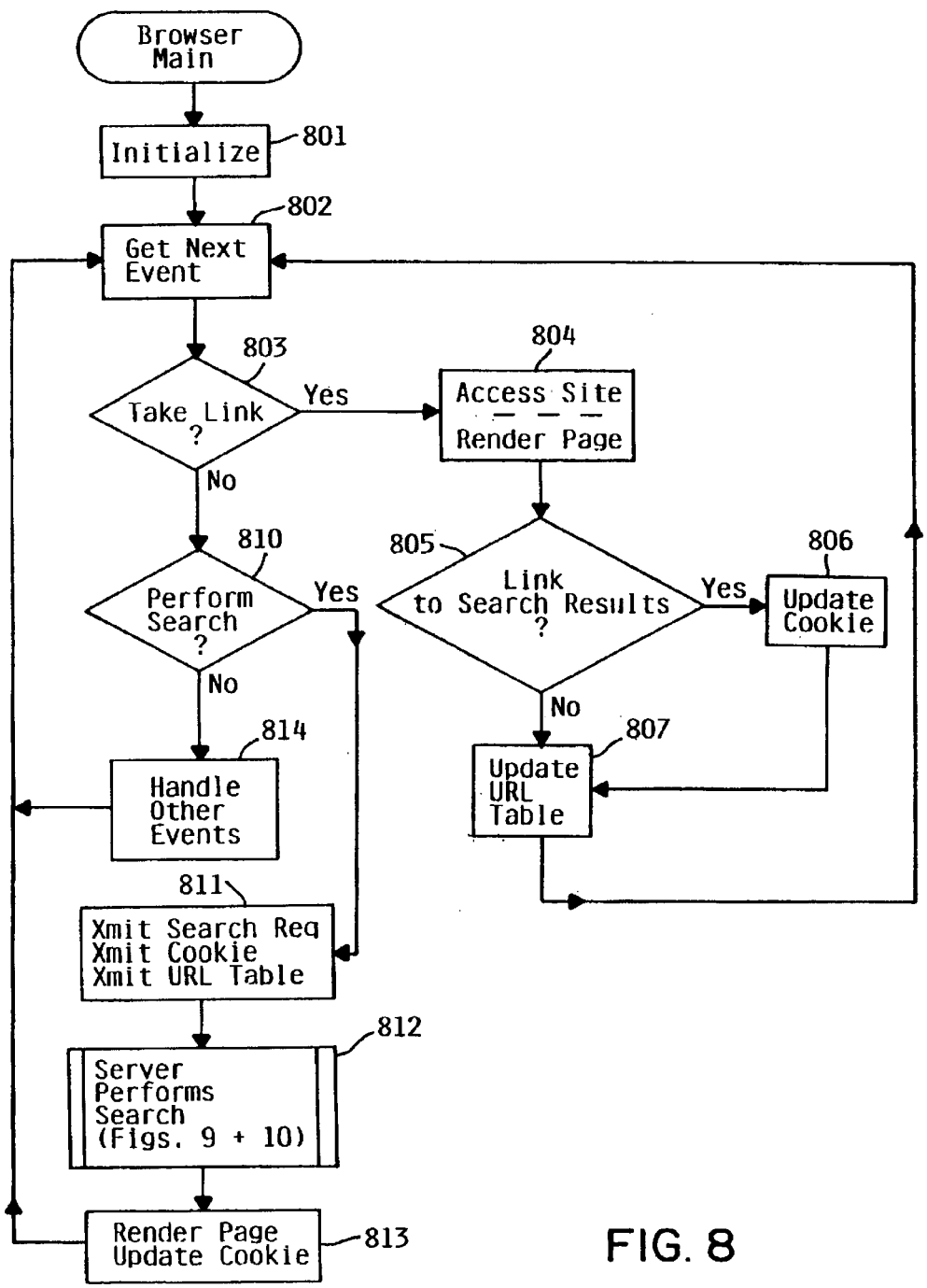
FIG. 8 is a high-level flow diagram of the steps performed at the client's browser, in accordance with the preferred embodiment.

FIG. 8 is a high-level flow diagram of the steps performed at the client's browser, in accordance with the preferred embodiment. The browser is initialized and a connection is established with the Internet through some internet provider (step 801). The browser, being interactive, sits in a loop waiting for an event (step 802). If the event is a command from a user to take a link, i.e. visit a web site specified by a URL address (step 803), the browser accesses the specified web site and displays it to the user (step 804). Concurrently, if the link is to a page of search results from a search engine operating in accordance with the preferred embodiment of the present invention (step 805), the page counter field 614 of the cookie passed by the browser is updated if the retrieved page is less than the current page counter field value (step 806). Step 806 is preferably performed by a JavaScript passed to the browser from the search engine. The browser then updates URL visited table 324 with the URL just linked to and the required table information concerning this URL (step 807).

If the event is a search command to a search engine operating in accordance with the preferred embodiment of the present invention (step 810), the browser transmits a search request to the search engine, including the cookie corresponding to the search engine, and the contents of URL table 324 (step 811). The server performs a search responsive to the search request, represented in FIG. 8 as block 812 (which is actually performed at a different computer system). When the results are returned, the page is rendered and the cookie is updated (step 813).

If the event is of a different type, it is handled appropriately as represented by block 814.

Figure 9:
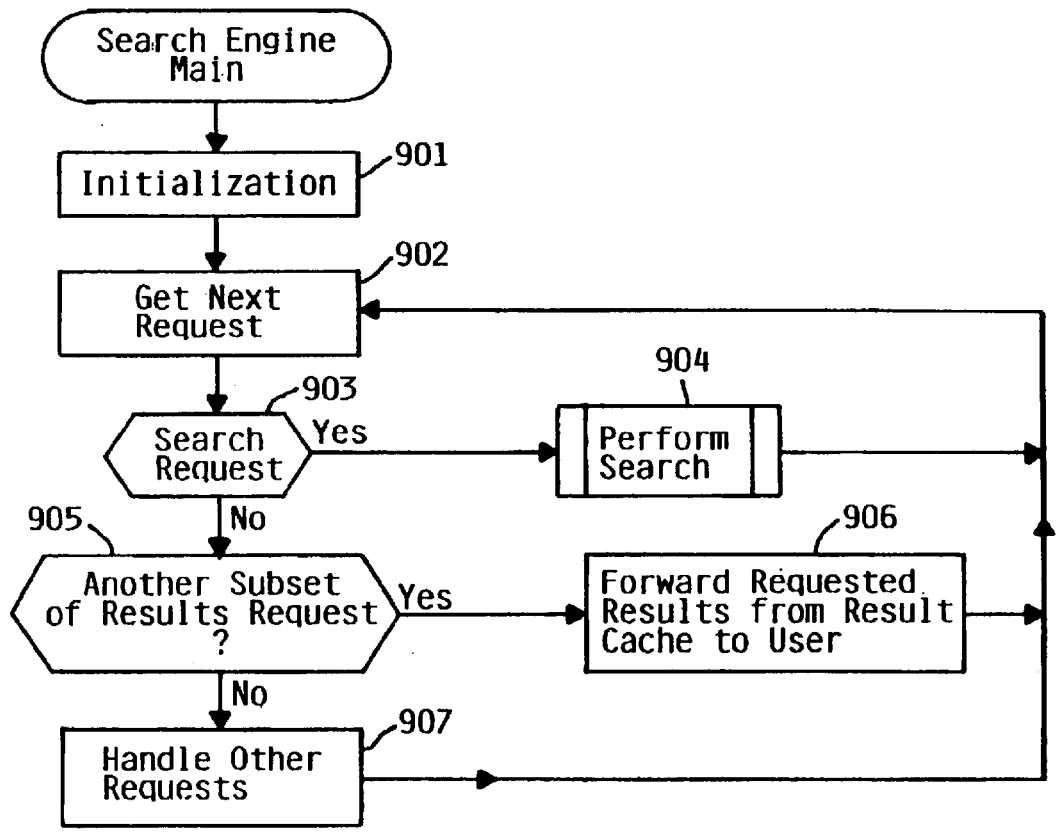
FIG. 9 is a high-level flow diagram of steps performed by server system 100 in responding to client requests over the Internet, according to the preferred embodiment.

FIG. 9 is a high-level flow diagram of steps performed by server system 100 in responding to client requests over the Internet. This system is typically initialized once or on rare occasions (step 901), and kept running 24 hours a day responding to user requests. A request is received over the Internet and pulled off the request queue 204, generally in the order received (step 902). If the request is a search request (step 903), searcher 210 is invoked to perform a search of URL database 202. The steps required to perform the search using searcher 210 and format results with HTML generator 206 are depicted in high-level FIG. 9 as step 904, and described herein in greater detail with respect to FIG. 10. If the request is for another page of results from a search (step 905), the page is pulled from a cache of results and transmitted to the client (step 906). This occurs, for example, when a search generates multiple web pages of results, only one of which is returned at a time to the client. If the client requested some other service, the other request is handled be appropriate programs residing in server 100 (step 907).

Figure 10A:
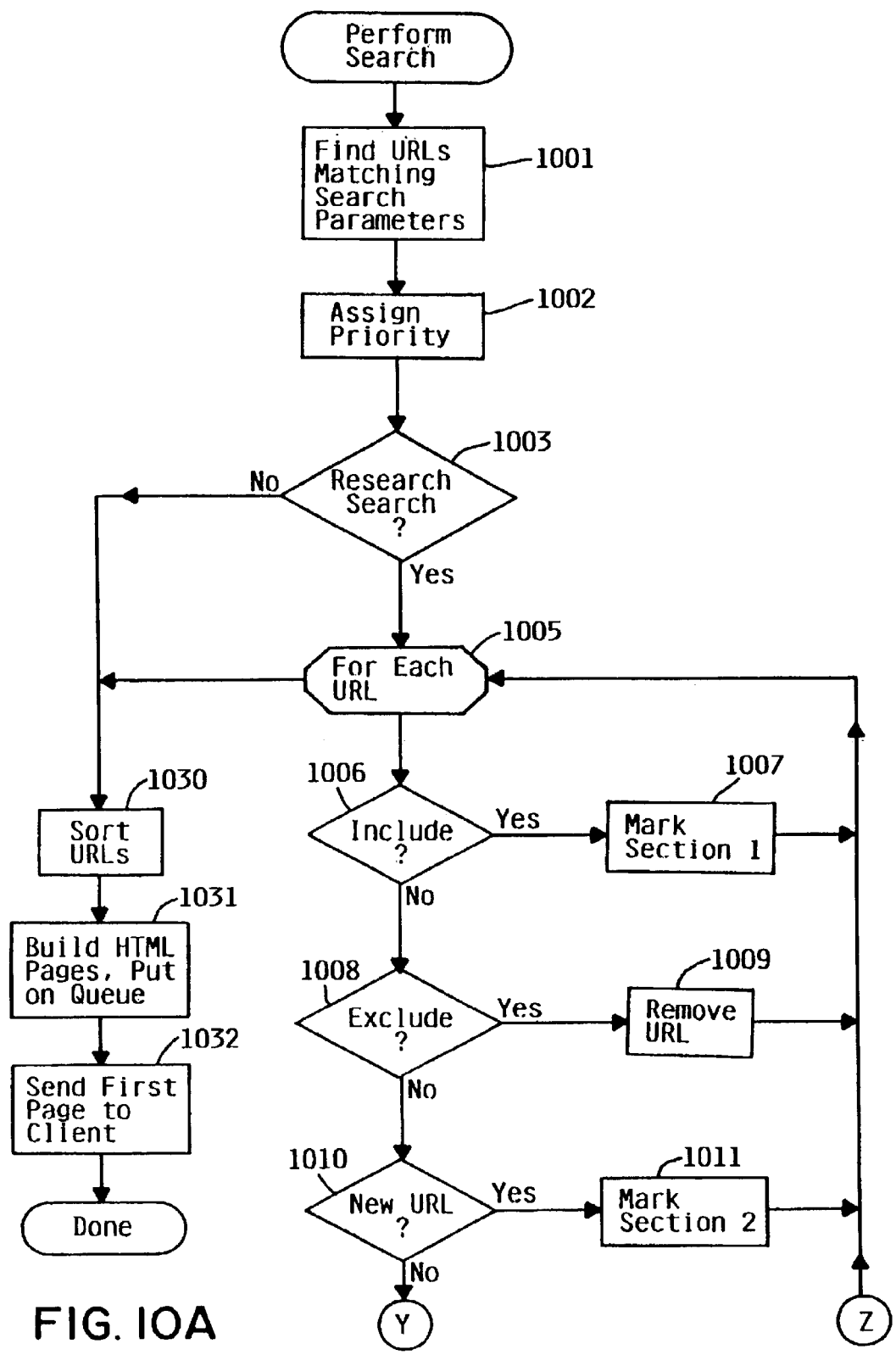
FIG. 10 shows in greater detail the steps performed by the search engine system 100 in response to a search request, in accordance with the preferred embodiment.
Figure 10B:
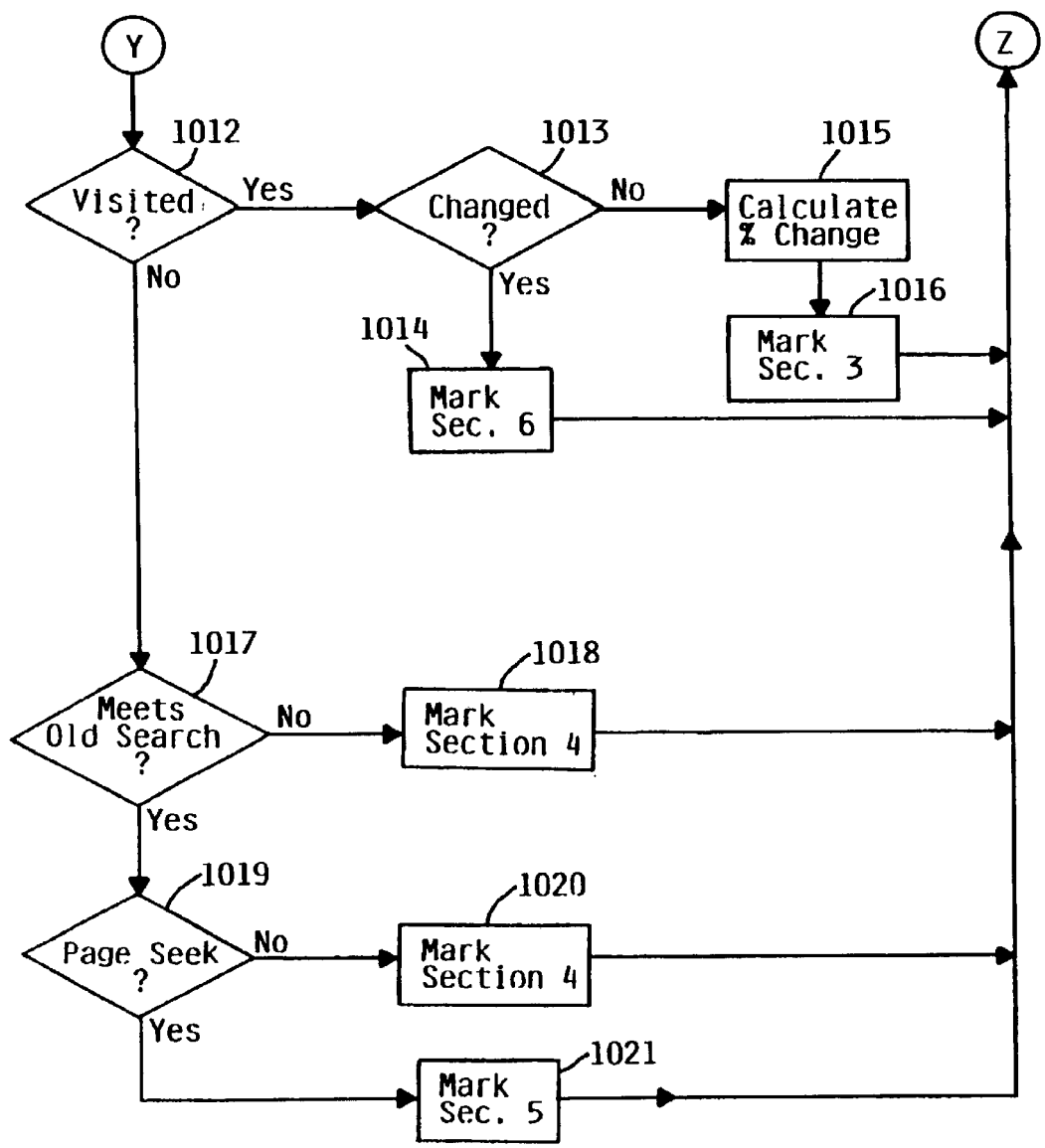

FIG. 10 shows in greater detail the steps performed by the search engine system 100 in response to a search request, in accordance with the preferred embodiment. Upon receiving a search request, searcher 210 scans URL database 202 for URLs matching the search parameters specified by the client (step 1001). Upon finding a match, an entry 700 for the URL is created in staging table 212. At this point, section field 705 and percent change field 706 are initialized to some value indicating undefined data. Searcher 210 places a respective entry in the staging table for each match found. Any of various prior art search algorithms may be used for searching the database and determining whether a particular URL matches the search parameters.

Searcher 210 additionally assigns a priority weight to each URL for use in prioritizing the list of search results for the user (step 1002). While depicted in FIG. 10 as a separate step, this step may in fact be performed concurrently with step 1001. Any of various prior art priority weighting algorithms may be used for this purpose. The respective priority weight for each URL is stored in staging table 212 at priority field 704.

Searcher 210 then determines whether the search request is a research-type search request, requiring prioritization of results on the basis of a previous search (step 1003). Preferably, the server presents this as an option to the user on the search menu when the search is submitted, and the user specifies whether a research-type search is desired. If the search is not a research-type search, the results are prioritized in the conventional manner using priority field 704 (step 1030).

If a research search is requested, prioritizer 211 retrieves each URL in staging table 212 (step 1005), in order to assign a "section" to the URL.

Prioritizer 211 then scans the cookie 601 that was passed with the search request identifying a previous corresponding search. Preferably, a previous corresponding search is a search having the same search identifier as the present search, the search identifier having been stored in field 611 of each cookie entry. If search identifiers are not used, or if the user did not specify a search identifier, it would alternatively be possible to match the search parameters (either requiring an exact match of the search string, or a closeness match).

Prioritizer 211 reviews entry in the cookie that was passed with the search request in order to find any URLs which were specified by the user to be included or excluded. I.e., if there exist any include/exclude records 620 in the cookie, the URLs 622 in the include exclude records 620 are either included or excluded, depending on the setting of include/exclude bit 621. If a URL is marked in the cookie as "include" (step 1006), prioritizer assigns a "1" to section field 705 of the URL's entry in staging table 212 (step 1007). If the URL is marked in the cookie as "exclude" (step 1008), the URL is deleted from the staging table (step 1009).

Prioritizer 211 then determines whether the URL under consideration was added to the database since the previous search (step 1010). This is accomplished by comparing the created timestamp field 702 in staging area 212 with the timestamp of the last search 613 from the cookie. If a URL was added to the database after the last search, prioritizer assigns it to section 2 in section field 705.

Prioritizer 211 then reviews the table of URLs visited 324 that was passed in by the browser to determine if the URL under consideration has previously been visited by the client (step 1012). A web site has been visited if there exists a corresponding entry in the table of URLs visited 324. If a URL has been previously visited, prioritizer compares the timestamp 662, page count 663, image count 664 and page size 665 information from the URL table 324 with corresponding information (fields 703, 707, 708 and 709, respectively) from the server's URL database 202, now stored in staging table 212. If the timestamp indicating time of last update (field 703) is previous to the timestamp indicating time of last visit by the client (field 662) (step 1013), it is assumed that the web site has not changed since last visited by the client, and the prioritizer assigns section 6 to the URL in section field 705 (step 1014).

If the web site has changed, the prioritizer estimates the amount of the change as a percentage by comparing the page count, image count and page size information from the browser table 324 with corresponding information from its database 202, stored in staging table 212 (step 1015). While many different formulae may be used to obtain a quantification of the amount of change, the following formula is used in the preferred embodiment:

$$\text{Change} = (\text{Abs}(\text{orig\_page\_size} - \text{new\_page\_size})/\text{orig\_page\_size}) + (\text{Abs}(\text{orig\_page\_count} - \text{new\_page\_count}) \times 0.05) + (\text{Abs}(\text{orig\_image\_count} - \text{new\_image\_count}) \times 0.1)$$

Where:
- orig_page_size in the page size in bytes when previously viewed;
- new_page_size is the current page size in bytes;
- orig_page_count is the page count when previously viewed;
- new_page_count is the current page count;
- orig_image_count is the image count when previously viewed;
- new_image_count is the current image count; and
- Abs is the absolute value function.

The amount of change as computed above is stored in field 706 of staging table, and the URL is assigned section 3 in section field 705 (step 1016).

If the URL under consideration has not been visited, prioritizer 211 then guesses whether it was previously presented to and seen by the user in response to the prior search. Prioritizer first analyzes the search string from the prior search (from cookie field 612) with respect to the URL's information in database 202 to determine whether the URL meets the parameters of the previous search (step 1017). If not, it is unlikely to have been seen by the user, and is assigned section 4 (step 1018). If the URL meets the parameters of the previous search, the prioritizer estimates the page number at which the URL would be presented based on its calculated priority in priority field 704, and compares this with the page counter field 614 from the cookie (step 1019). If the cookie's page counter field 614 is less than the estimated page number, then the URL was probably not seen, and is assigned section 4 (step 1020). Otherwise, it is assumed the URL was seen, and it is assigned section 5 (step 1021).

When all URLs in staging table 21 have been processed, the URLs are sorted in order of priority (step 1030). When sorting, the URLs will be sorted by section field 705, section 1 being the highest priority (presented first to the user), and section 6 being the lowest. Within a section, URLs will be sorted by priority 704. An exception to this rule is made in the case of section 3, in which URLs are sorted by percentage change field 706. Where the search is not a research search using the results of a previous search for prioritization (ie., the "No" branch was taken from step 1003), all the section entries 705 will be some default value, such as 0, and therefore all URLs will be sorted by priority from priority field 704.

After the prioritizer has sorted all results, HTML generator 206 builds one or more HTML pages and stores these in response queue 207 (step 1031). The first page is then transmitted to the client 300 over the Internet (step 1032). Subsequent pages are later transmitted upon request of the client.

FIGS. 11–13 illustrate a simple example of the application of the present invention. In this example, client 300 requests a first search for information concerning the Boston Red Sox baseball team. Search engine 100 returns a list of eleven URLs 1101–1111, ranked in order of a priority computed by the search engine, as shown in FIG. 11.

In this example, the user selects links 1101, 1103, 1105, 1108, 1109 and 1110 for visiting. The user further instructs the search engine to always exclude links 1102 and 1107, and to always include links 1108 and 1109. Subsequently, the user requests a follow-up search, using the same or similar search parameters.

FIG. 12 shows the results of the second search after the searcher has performed step 1002. In this example, the searcher 210 found fourteen hits in the database 1201–1214, there being three new links (1210, 1213 and 1214), plus the original links. In FIG. 12, these links are ranked in priority order computed according to the same priority algorithm as the original search.

FIG. 13 shows the list of links 1301–1312 ultimately presented as search results of the second search to the user, in the order of presentation. It will be observed that links 1202 and 1208 have been deleted, since these were specified as "exclude". The order of the remaining links is significantly changed. At the top of the list, links 1301 and 1302 are links which were assigned a relatively low priority in FIG. 12, but because the user specified that these two links always be included, they are assigned to section 1, the first listed group. Links 1303–1305 are the three new links, which again were a given relatively low priority in FIG. 12, but are assigned to group 2. Links 1306–1308 are links which the user visited before, but which have changed. Note that these are ranked in FIG. 13 not in order of priority shown in FIG. 12, but according to an estimate of the amount of change. Links 1309–1311 are links which were not visited previously (group 4), and link 1312 is a link which was visited previously, but has not changed.

If one compares FIG. 13 with FIG. 12, one can see that there is a noticeable improvement in the quality of information presented to the user. FIG. 12 is little more than a repetition of the original FIG. 11, with three new sites added at a low rank, and some miscellaneous changes due to changes in the web sites themselves. FIG. 13, on the other hand, puts at the highest ranks those sites the user has indicated a definite interest it, and the new sites the user could not have seen before. Additionally, it excludes sites the user is definitely not interested in, thus not burdening the user with useless information. In this very simplified example, it may seem that the user could easily review all the results manually even if not presented in the optimal format. But it will be appreciated by web users that search engines frequently return many pages of results, and that a system which ranks the results in a more intelligible and useful manner to the user provides a significant advantage over existing art search engines.

In the preferred embodiment, the browser stores information in both a cookie and in the URL table, both of which are transmitted to the search engine with a research search request. The use of the URL table permits certain ranking to be done by the search engine. It would alternatively be possible to keep additional information in the cookie, transmitting only the cookie. For example, all URLs returned in a previous search could be stored in the cookie, or a JavaScript supplied by the search engine could put any URLs selected from the page of search results in the cookie. Either of these implementations would have the advantage of not requiring any special code in the browser, and would not require transmission of a potentially large URL table, although at a cost of reducing the amount of information available to the search engine for making its ranking decisions. It will further be understood that many additional variations in cookie data structure, URL table structure, or other data structures are possible, as are different combinations of data structures.

In the preferred embodiment, a particular ranking scheme is presented. However, by using information about the results of prior searches, it is possible to employ many variations on the ranking methods described herein, and the present invention should not be taken as limited to any particular ranking scheme. In particular, it would be possible for the client to specify how it wants different categories of URL hits to be ranked.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 104.

Although a specific embodiment of the invention has been disclosed along with certain alternatives, it will be recognized by those skilled in the art that additional variations in form and detail may be made within the scope of the following claims:

What is claimed is:

1. A method of searching for information on the web, comprising the steps of:

transmitting a first search request from a first client to a search engine server, said search request being transmitted over the Internet, said search engine server responding to multiple search requests received from multiple respective clients over the Internet;

transmitting results of said first search from said search engine server to said first client over the Internet;

transmitting a second search request from said first client to said search engine server, said second request being transmitted over the Internet, said second search request including a plurality of second search query parameters defining a set of responsive items, said second search request further including information relating to said results of said first search, said information relating to said results of said first search being in addition to said second search query parameters;

generating results responsive to said second search request from said set of responsive items, said results being generated by said search engine server and being customized to said first client by said search engine server using said information relating to said results of said first search, wherein said step of generating results responsive to said second search request comprises re-ordering a respective priority of a plurality of URLs satisfying parameters of said second search request by (a) estimating an amount of change of a plurality of URLs using said information relating to said first search, and (b) prioritizing said plurality of URLs using the estimated amount of change; and transmitting said results responsive to said second search request to said first client over the Internet.

2. The method of claim 1, wherein said step of re-ordering priority of a plurality of URLs comprises increasing the priority of new URLs.

3. The method of claim 1, wherein said step of transmitting a second search request from said first client to said search engine server comprises transmitting a cookie containing information relating to said first search.

4. A computer program product for providing web searches in a server computer coupled to the Internet, said computer program product comprising:

a plurality of processor executable instructions recorded on signal-bearing media, wherein said instructions, when executed by said processor, cause said server computer to perform the steps of:

determining a respective set of URLs meeting the parameters of each of a plurality of search requests, each said search request being received from a respective client over the Internet;

prioritizing the URLs in each said respective set of URLs according to a prioritization algorithm; and for a first set of URLs meeting the parameters of a first search request received from a first client, modifying the relative priority of URLs within said first set produced by said prioritizing step, without modifying said prioritization algorithm for use by other clients of said server computer, using information about results of a previous search performed by said search engine server, said information about results of a previous search performed by said search engine server being in addition to said parameters of said first search request, said information about results of a previous search being transmitted by said first client to said search engine server over the Internet.

5. The computer program product of claim 4, wherein said information about a previous search is transmitted by said first client to said search engine in a cookie.

6. The computer program product of claim 4, wherein said information about a previous search comprises a search string from said previous search.

7. The computer program product of claim 4, wherein said information about a previous search comprises web sites previously visited by said first client.

8. The computer program product of claim 7, wherein said step of: modifying the relative priority of URLs comprises comparing URLs in said first set of URLs meeting the parameters of the first search request with URLs of web sites previously visited by said first client.

9. A web server computer system for providing web searches responsive to requests received from clients, comprising:

a database of web information, said database containing a plurality of URLs;

a search engine for searching said database of web information responsive to a plurality of search requests received from clients to produce a respective set of URLs meeting the parameters of each said search request received from a client;

a prioritizer for prioritizing each said respective set of URLs produced by said search engine according to an internal prioritization algorithm, wherein said prioritizer uses prioritization information transmitted with a first search request by a first client to said web server computer system to modify the relative priorities, according to said internal prioritization algorithm, of the set of URLs produced by said search engine responsive to said first search request, without modifying said internal prioritization algorithm for use by other clients of said web server computer system, said prioritization information being information in addition to said parameters of said search request.

10. The web server computer system of claim 9, wherein said prioritization information is transmitted by said first client to said search engine in a cookie.

11. The web server computer system of claim 9, wherein said prioritization information comprises a search string from a previous search.

12. The web server computer system of claim 9, wherein said prioritization information comprises URLs of web sites previously visited by said first client.

13. The web server computer system of claim 12, wherein said prioritizer prioritizes said set of URLs meeting the parameters of the first search request by comparing URLs in said set of URLs meeting the parameters of the first search request with URLs of web sites previously visited by said first client.

14. The web server computer system of claim 9, wherein said prioritization information is information relating to the results of a previous search performed by said search engine responsive to a request from said first client.

* * * * *